Aug. 11, 1959  M. N. YARDNEY  2,899,635
ELECTRIC BATTERY WITH CHARGE TESTING MEANS
Filed Dec. 20, 1954

INVENTOR:
MICHEL N. YARDNEY
BY
AGENT

United States Patent Office 2,899,635
Patented Aug. 11, 1959

2,899,635

ELECTRIC BATTERY WITH CHARGE TESTING MEANS

Michel N. Yardney, New York, N.Y., assignor to Yardney International Corp., New York, N.Y., a corporation of New York Application December 20, 1954, Serial No. 476,367

14 Claims. (Cl. 324—29.5)

This application is a continuation-in-part of my co-pending application Serial No. 275,284, filed March 7, 1952, and now U.S. Patent No. 2,812,376, issued November 5, 1957.

In said co-pending application I have disclosed the discovery of major pressure variations, depending on the state of charge, in an electric (e.g. alkaline silver-zinc) cell or battery of the type in which the electrodes and the interelectrode separators are held in compression by the surrounding casing.

As also disclosed in said co-pending application, there exists a definite and substantially invariable correspondence between the state of charge of a given battery and the pressure obtaining within its casing. It is the object of the instant invention to provide a method of and means for determining such state of charge on the basis of this pressure.

More particularly, the invention envisages the measuring of the internal pressure of a battery and the computation of its instantaneous state of charge from this pressure, such computation being readily possible by reason of the aforementioned relationship. This relationship can be determined empirically, for example, for an individual cell or battery, or for a prototype of a series of such units, and can be made available for future reference in the form of tables, graphs or formulas.

Various means can be used for measuring the internal pressure of a cell or battery. Especially in the case of larger units this can be done visually, e.g. with the aid of a graduation on the transparent casing as illustrated in my aforementioned co-pending application. More reliable measurements, however, can be obtained through the use of electrical pressure gauges, e.g. conductivity or capacity gauges known per se.

The invention will be more fully described with reference to the accompanying drawing in which.

Figure 1:
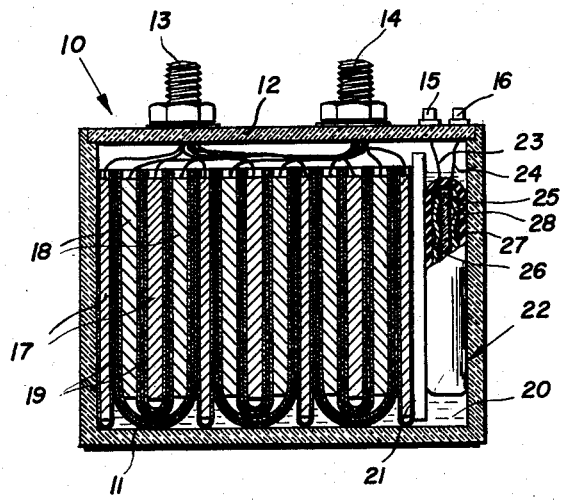
Fig. 1 is a sectional view of a battery casing containing, in accordance with this invention, an electrode assembly juxtaposed with a pressure-measuring device.

The battery 10, Fig. 1, comprises a casing 11 and a cover 12, the latter carrying a pair of principal terminals 13 (negative) and 14 (positive) as well as a pair of auxiliary terminals 15, 16. Terminal 13 is connected in parallel to a set of negative electrodes 17, terminal 14 being similarly connected to positive electrodes 18 alternating with the electrodes 17. The electrodes 17 and 18, which may contain zinc and silver respectively, are separated by layers 19 of semi-permeable sheet material, such as regenerated cellulose, having the tendency to swell in the alkaline electrolyte 20.

Inserted within casing 11 alongside the electrode assembly 17, 18, 19, and separated therefrom by a substantially rigid but movable plate 21 of inert (e.g. plastic) material, is an electric pressure gauge 22 from which a pair of leads 23, 24 extend to the auxiliary terminals 15 and 16 respectively. This gauge 22 has been illustrated, by way of example only, as being of the capacitive type and comprising a flexible and liquid-impermeable sheath 25 (e.g. of polyethylene), a pair of condenser plates 26, 27 respectively connected to leads 23 and 24, and a dielectric spacer 28 (e.g. a mica sheet) inserted between these plates.

The condenser plates 26, 27 are shown to be slightly deformed or corrugated to provide the necessary resiliency counteracting the pressure of the electrode assembly. The dimensions of gauge 22 relative to the other elements of the battery 10 have been greatly exaggerated in Fig. 1 for the sake of clarity.

Figure 2:
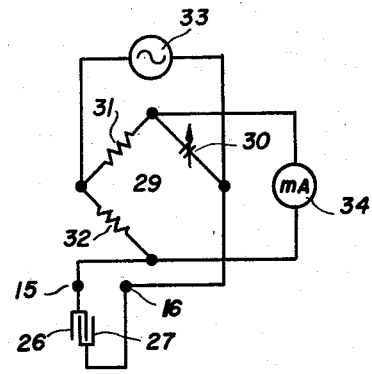
Fig. 2 is a circuit diagram serving to explain the operation of the device of Fig. 1.

In the circuit of Fig. 2 I have shown the capacitance 26, 27 of unit 22 connected, via terminals 15 and 16, in one arm of a bridge circuit 29 having an adjustable condenser 30 connected in another arm; the remaining two arms are represented by impedances schematically illustrated as resistors 31, 32. A source 33 of alternating current is connected across one diagonal of the bridge 29; an indicator, schematically illustrated as a milliammeter 34, is connected across the other diagonal.

The circuit of Fig. 2 may be used both for calibrating a unit such as the battery 10 and for determining the state of charge of such unit by referring to the charge/pressure relationship determined upon calibration. For calibration purposes the actual capacitance of the pressure gauge is determined, at various stages of the charge-discharge cycle of the battery under test, from the known impedance values of the bridge circuit 29 and is then translated into pressure in accordance with the predetermined performance characteristics of the gauge. A typical calibration diagram for a battery of the type shown in Fig. 1 is given in Fig. 3.

Figure 3:
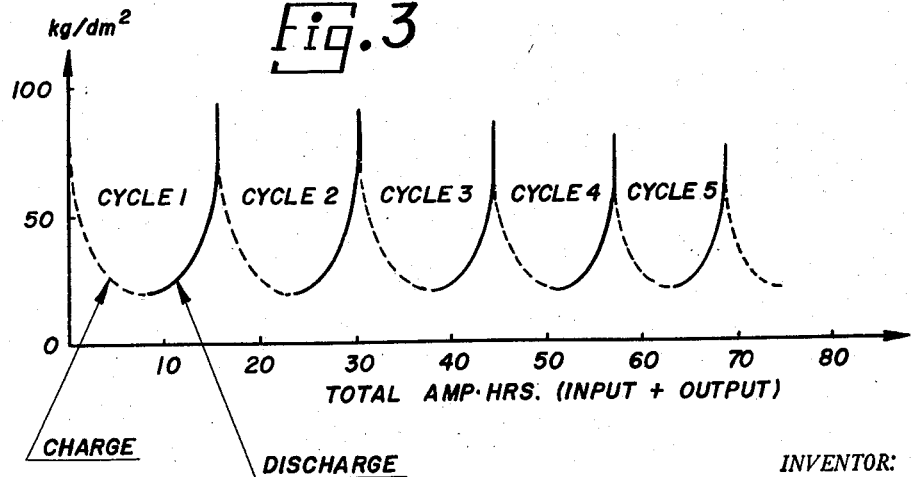
Fig. 3 is a graph illustrating the relationship between pressure and state of charge in a battery of the type shown in Fig. 1.

The graph of Fig. 3 shows that the particular battery considered, when fully discharged at the beginning of its first or formative cycle, develops an internal pressure of about 100 kg./dm.$^2$; upon charging, this pressure drops to approximately 25 kg./dm.$^2$, thereupon rising again to a value close to the starting pressure as the battery is being discharged. Since on successive cycles there may occur a slight drop in the storage capacity of the battery, the peak pressure may decline somewhat upon subsequent discharges as illustrated in the drawing. Nevertheless, a given pressure will always correspond, at least approximately, to the same amount of stored electrochemical energy irrespective of cycle. It may be mentioned that this pressure will generally range above 15 kg./dm.$^2$, thus above the preferred minimum pressure in accordance with the teachings of U.S. Patent No. 2,594,713, issued April 29, 1952.

When the circuit of Fig. 2 is used for charge measurements, the condenser 30 is first adjusted until a zero reading is obtained on the meter 34 in either the fully charged or the fully discharged condition of the battery. With a reference point thus established, the pressure at a subsequent stage may be directly read on the meter 34 which for this purpose can be suitably calibrated, e.g., in kilograms per square decimeter or in pounds per square inch. With the aid of the graph of Fig. 3, or its equivalent in table form or expressed as a formula, the pressure so ascertained can be translated into ampere-hours or other units of charge.

For best results, both during calibration and when taking measurements, it is desirable that a certain period should elapse between any (full or partial) charge or discharge and the reading of the pressure. This period, which may be of the order of several hours or longer, gives the electrodes time to complete certain reactions and to reach the physical and chemical equilibrium corresponding to the state of charge attained; as a result, the value observed will correspond more closely to the one theoretically expected.

It may be mentioned that the herein disclosed method of pressure measurements in an electric cell or battery is useful also for determining whether the electrolytic permeation of an electrode assembly in its virgin state has been completed. Thus, failure of the electrolyte to irrigate satisfactorily the electrodes of the assembly will be reflected in a lack of compression when compared with the theoretical value for this stage, e.g. as indicated on the extreme left in the graph of Fig. 3. The user will, therefore, be cautioned to add more electrolyte and to delay the formative charging of the battery until the proper pressure has been reached.

While the gauge 22 may assume a variety of forms, a flat or nearly flat device of smallest possible dimensions will be preferred in practice. Also, the elasticity of such device should be high enough to minimize its effect upon the pressure of the electrode assembly, thus its electrical output should show substantial increments with small variations in thickness. It will be understood, however, that my invention is not limited to any specific type of gauge or circuit therefor and that it is susceptible of numerous modifications and adaptations within the spirit and scope of the appended claims.

I claim:

1. In an electric cell, in combination, a casing, an electrode assembly held under pressure in said casing, pressure gauge means in said casing in pressure-transmitting contact with said assembly, and pressure-indicating means controlled by said gauge means.

2. In an alkaline cell, in combination, a casing, an electrode assembly held under pressure in said casing, an electric pressure gauge in said casing in pressure-transmitting contact with said assembly, and electrical indicator means connected to said gauge means.

3. An electric battery comprising a casing, a set of alternately positive and negative electrodes in said casing, an electrolyte in said casing, separator means in said casing swellable in said electrolyte, means including said separator means and said casing maintaining said electrodes under pressure, gauge means inserted in said casing alongside said electrodes in pressure-transmitting contact therewith, and pressure-indicating means controlled by said gauge means.

4. A battery according to claim 3, wherein said gauge means comprises a pressure-responsive electric impedance element.

5. A battery according to claim 4, wherein said impedance element is inserted between an outermost one of said electrodes and a wall of said casing.

6. A battery according to claim 3, wherein said separator means comprises a semi-permeable sheet material.

7. A battery according to claim 3, wherein said negative electrodes contain zinc.

8. A battery according to claim 3, wherein said positive electrodes contain silver.

9. A battery according to claim 3, wherein said positive and negative electrodes contain silver and zinc respectively.

10. In combination, an electric battery comprising a casing, a set of alternately positive and negative electrodes in said casing, an alkaline electrolyte in said casing, separator means in said casing swellable in said electrolyte, and means including said separator means and said casing maintaining said electrodes under pressure; an electrical pressure gauge inserted in said casing alongside said electrodes in pressure-transmitting contact therewith, said gauge having an output circuit outside said casing; and pressure-indicating means connected in said output circuit and controlled by said gauge.

11. The combination according to claim 10, wherein said gauge comprises a pressure-sensitive impedance element.

12. The combination according to claim 11, wherein said output circuit includes an impedance bridge having said impedance element connected in one arm thereof, and a source of current connected across one diagonal of said bridge, said indicator means being connected across the other diagonal of said bridge.

13. The combination according to claim 12, wherein said bridge includes a compensating impedance element adjustable to give a null reading on said indicator means.

14. In an electric cell, in combination, a casing, an electrode assembly held under pressure in said casing, gauge means operatively connected with said assembly for measuring the pressure thereof, and pressure-indicating means controlled by said gauge means.

References Cited in the file of this patent

UNITED STATES PATENTS

| | | |
|---|---|---|
| 2,072,915 | Willach et al. | Mar. 9, 1937 |
| 2,547,780 | Reynst | Apr. 3, 1951 |
| 2,594,709 | Andre | Apr. 29, 1952 |